US007328355B2

(12) United States Patent
Arakawa

(10) Patent No.: US 7,328,355 B2
(45) Date of Patent: Feb. 5, 2008

(54) DATA PROCESSING DEVICE AND SEMICONDUCTOR DEVICE

(75) Inventor: Fumio Arakawa, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 480 days.

(21) Appl. No.: 10/933,292

(22) Filed: Sep. 3, 2004

(65) Prior Publication Data

US 2005/0268123 A1 Dec. 1, 2005

(30) Foreign Application Priority Data

May 25, 2004 (JP) ............................. 2004-154232

(51) Int. Cl.
*G06F 1/32* (2006.01)
(52) U.S. Cl. ..................................... 713/300
(58) Field of Classification Search ................. 713/300
See application file for complete search history.

(56) References Cited

U.S. PATENT DOCUMENTS

| 6,000,036 | A | 12/1999 | Durham et al. | |
|---|---|---|---|---|
| 6,834,353 | B2 * | 12/2004 | Smith et al. | 713/320 |
| 7,058,824 | B2 * | 6/2006 | Plante et al. | 713/300 |
| 7,100,056 | B2 * | 8/2006 | Barr et al. | 713/320 |
| 7,124,321 | B2 * | 10/2006 | Garnett et al. | 714/14 |

FOREIGN PATENT DOCUMENTS

| JP | 10-69330 | 7/1997 |
|---|---|---|
| JP | 10-91298 | 7/1997 |

* cited by examiner

*Primary Examiner*—Rehana Perveen
*Assistant Examiner*—Eric Chang
(74) *Attorney, Agent, or Firm*—Reed Smith LLP; Stanley P. Fisher, Esq.; Juan Carlos A. Marquez, Esq.

(57) ABSTRACT

The disclosure describes a semiconductor device having a plurality of modules each enabled to perform properly while managing allowable power for an entire chip through distributed power control. A predetermined allowable power consumption value is defined for each module. The predetermined power consumption value refers to power consumption defined taking into account allowable power values for a plurality of modules. Each module takes a difference between the predetermined allowable power consumption value and an actual power consumption value as extra power and notifies other modules of the extra power thereof. To avoid a deadlock, each module is designed to be capable of performing data processing below the predetermined power consumption value without using extra power from another module. When notified of extra power by another module, each module can use for data processing power equal to the predetermined power consumption thereof and the extra power.

13 Claims, 14 Drawing Sheets

| Type | Input | | | | Output | Power |
|---|---|---|---|---|---|---|
| | PCNTL | PLOWR | GOL1 | GOR0 | PGOL1 | |
| 1 | ≤2 | - | 1 | - | 1 | ≤2 |
| 2 | 3 | 1 | 1 | - | 1 | 3 |
| 3 | 3 | - | 1 | 0 | 1 | 3 |
| 4 | 4 | - | 1 | 0 | 1 | 4 |
| 5 | otherwise | | | | 0 | ≤2 |

| PCNTL | |
|---|---|
| value | encoding |
| ≤2 | 0* |
| 3 | 10 |
| 4 | 11 |

FIG. 5

| Type | Input | | | | | | Output | |
|---|---|---|---|---|---|---|---|---|
| | PCNTL | PLOWR | PSTL | PSTR | GOL | GOR | PGOL | NPSTL |
| 1 | 1 | - | ≤1 | - | 1 | - | 1 | 1 |
| 2 | 1 | 1 | - | 0 | 1 | - | 1 | 1 |
| 3 | 1 | - | - | ≤1 | 1 | 0 | 1 | 1 |
| 4 | 2 | - | 0 | - | 1 | - | 1 | 2 |
| 5 | 2 | 1 | ≤1 | 0 | 1 | - | 1 | 2 |
| 6 | 2 | - | ≤1 | ≤1 | 1 | 0 | 1 | 2 |
| 7 | 2 | - | - | 0 | 1 | 0 | 1 | 2 |
| 8 | otherwise | | | | | | 0 | 0 |

| Type | Input | | | | | Output |
|---|---|---|---|---|---|---|
| | PCNTL | PLOWR | PTKNL | GOL | GOR | PGOL |
| 1 | - | - | 1 | 1 | - | 1 |
| 2 | 1 | 1 | - | 1 | - | 1 |
| 3 | - | - | - | 1 | 0 | 1 |
| 4 | otherwise | | | | | 0 |

| PCNTL | |
|---|---|
| value | encoding |
| 1 | 0 |
| 2 | 1 |

FIG. 11

| Type | Input | | | | | | | Output | Power |
|---|---|---|---|---|---|---|---|---|---|
| | PCNTy | PLOWxL | PLOWzR | GOy1 | GOx0 | GOz0 | | PGOy1 | |
| 1 | ≤4 | - | - | 1 | - | - | | 1 | ≤4 |
| 2 | 5 | 1 | - | 1 | - | - | | 1 | 5 |
| 3 | 5 | - | 1 | 1 | - | - | | 1 | 5 |
| 4 | 5 | - | - | 1 | 0 | - | | 1 | 5 |
| 5 | 6 | 1 | - | 1 | - | 0 | | 1 | 6 |
| 6 | 6 | - | 1 | 1 | 0 | - | | 1 | 6 |
| 7 | 6 | - | - | 1 | - | 0 | | 1 | 6 |
| 8 | 7 | 1 | - | 1 | - | 0 | | 1 | 7 |
| 9 | 7 | - | 1 | 1 | 0 | 0 | | 1 | 7 |
| 10 | 7 | - | - | 1 | 0 | 0 | | 1 | 7 |
| 11 | 7 | - | - | 1 | 0 | 0 | | 1 | 7 |
| 12 | 8 | - | - | 1 | 0 | 0 | | 1 | 8 |
| 13 | otherwise | | | | | | | 0 | ≤4 |

FIG. 13

| Type | Input | | | | | | Output | Power |
|---|---|---|---|---|---|---|---|---|
| | PCNTty | PLtxU | PLtzD | PLsyL | PLuyR | GOty1 | PGOty1 | |
| 1 | ≤4 | - | - | - | - | 1 | 1 | ≤4 |
| 2 | 5 | 1 | - | - | - | 1 | 1 | 5 |
| 3 | 5 | - | 1 | - | - | 1 | 1 | 5 |
| 4 | 5 | - | - | 1 | - | 1 | 1 | 5 |
| 5 | 5 | - | - | - | 1 | 1 | 1 | 5 |
| 6 | 6 | 1 | 1 | - | - | 1 | 1 | 6 |
| 7 | 6 | 1 | - | 1 | - | 1 | 1 | 6 |
| 8 | 6 | 1 | - | - | 1 | 1 | 1 | 6 |
| 9 | 6 | - | 1 | 1 | - | 1 | 1 | 6 |
| 10 | 6 | - | 1 | - | 1 | 1 | 1 | 6 |
| 11 | 6 | - | - | 1 | 1 | 1 | 1 | 6 |
| 12 | 7 | 1 | 1 | 1 | - | 1 | 1 | 7 |
| 13 | 7 | 1 | 1 | - | 1 | 1 | 1 | 7 |
| 14 | 7 | 1 | - | 1 | 1 | 1 | 1 | 7 |
| 15 | 7 | - | 1 | 1 | 1 | 1 | 1 | 7 |
| 16 | 8 | 1 | 1 | 1 | 1 | 1 | 1 | 8 |
| 17 | otherwise | | | | | | 0 | ≤4 |

FIG. 16

| Type | Input | | Output | Power |
| --- | --- | --- | --- | --- |
| | PCNTL | PLOWR | GOL1 | PGOL1 | |
| 1 | ≤7 | - | 1 | 1 | ≤7 |
| 2 | 8 | 1 | 1 | 1 | 8 |
| 3 | otherwise | | | 0 | ≤7 |

FIG. 17

| Type | Output | Power Level | | | | | | | |
| --- | --- | --- | --- | --- | --- | --- | --- | --- | --- |
| | | 1 | 2 | 3 | 4 | 5 | 6 | 7 | 8 |
| 1 | PCNTL | 0* | | | | | | 10 | 11 |
| | PLOWL | 1 | | 0 | | | | | |
| 2 | PCNTL | 0* | | | | | | 10 | 11 |
| | PLOWL | 1 | | | | | 0 | | |
| 3 | PCNTL | 0* | | | | | | | 10 |
| | PLOWL | 1 | | | | | | | 0 |

DATA PROCESSING DEVICE AND SEMICONDUCTOR DEVICE

CLAIMS OF PRIORITY

The present application claims prority from Japanese application JP 2004-154232 filed on May 25, 2004, the content of which is hereby incorporated by reference into this application.

BACKGROUND OF THE INVENTION

The prevent invention relates to data processing devices and semiconductor devices. More specifically, the present invention relates preferably to a semiconductor device in which a plurality of processors are composed of integrated circuits, in particular, CMOS circuits which change in power consumption depending on the operational states thereof, and which semiconductor device allows the processors to exhibit those performance well while minimizing the power consumption for the entire semiconductor chip.

With the expansion of portable device markets including a cellular phone market, there is growing importance of semiconductor chips operable even at a low power. It is desirable that the maximum power consumption, the average power consumption, the standby power consumption, and power distribution across a semiconductor chip should be each controlled to a low level when the semiconductor chip is operated.

The maximum power consumption serves as a factor in determining the power that is fed to a semiconductor chip. A smaller power supply capacity than the maximum power consumption will result in a voltage drop and therefore a chip malfunction. Consequently a chip with large maximum power consumption naturally requires a power supply system with a high power supply capacity, thus resulting in an increase in portable device costs and weights. The maximum power consumption serves as a factor in designing the heat dissipation capacity of a package or system. A large maximum power consumption will require a package or system with a high heat dissipation capacity. Also such a package or system will lead to an increase in portable device costs and weights.

The average power consumption also has a direct influence on the service life or weight of a portable device battery. The larger the average power consumption, the shorter the service life of a battery will be. A longer service life of a battery will therefore raise a problem of a heavier battery.

The standby power consumption will be important in systems whose power supply cannot be turned OFF when a portable device is not in use or which usually are used with the power supply turned ON. If, for example, a cellular phone is turned OFF when not in use, the cellular phone cannot receive incoming calls. For this reason, a cellular phone is, in many cases, always in the standby mode so that the phone can operate immediately after receiving an incoming call. If a cellular phone uses much power when in the standby mode, the phone can be kept in the standby mode for a short period of time.

Power distribution across a chip has an influence on the design of a chip power line and a power supply pin, and a heat dissipation capacity. A large local power consumption will result in a voltage drop and therefore a malfunction if a chip does not have a sufficient capacity to handle a voltage from a power line and power supply pin for power supply thereto. Large local heat generation and an insufficient heat dissipation capacity will also result in a temperature rise and therefore malfunction.

For power control for an integrated circuit, Japanese Patent Laid-open No. 10-69330 titled "Logical circuit and method for avoiding a hot spot on an integrated circuit," for example, discloses a technique for dividing an entire integrated circuit into a plurality of functional units and monitoring heat generation for each functional unit to control local heat generation to below an allowable level. Heat is generated when power consumption leads to Joule heat. Heat generation control to an allowable level or below means indirect control of a local maximum power consumption across a chip, i.e., power distribution control to an allowable level or below. The patent document states that this control therefore reduces a possibility of an obstacle due to overheat, thus allowing a reduction in power consumption across an entire chip.

In addition, Japanese Patent Laid-open No. 10-91298 titled "Self power monitor and control circuit for microprocessor functional units" states that a power sensing circuit is provided for each functional unit and a functional unit of interest is made to operate in a low power mode when the power consumption thereof exceeds a predetermined value.

There are typically two concepts for control of power across a semiconductor chip. One concept involves intensive control of power consumption for each functional module ("a functional unit" in Japanese Patent Laid-open Nos. 10-69330 and 10-91298) while the other involves local distributed power control as described in Japanese Patent Laid-open Nos. 10-69330 and 10-91298.

In recent years process miniaturization has caused a plurality of processor cores and many modules such as various IPs to be mounted on a single chip. Intensive power consumption control therefore requires power distribution to many modules, thus resulting in more power consumption information to be considered and a longer distance over which a signal travel. This makes control signal production a complicated and time-consuming processing.

In addition, the combination of various IPs to fabricate a system LSI requires a designer familiar with the power-related characteristics of all IPs to design a power control module for intensive control every time a system LSI is fabricated. This design is extremely difficult if many IPs are mounted on a single chip.

Only local power consumption control is important for power distribution across a chip, one of the power-related considerations mentioned above. A larger power consumption value cannot be set for one module even if each of the other modules located far away from the module has low power consumption. On the other hand, a larger value can be set for one module if each of the surrounding modules has low power consumption. Therefore, it can be said that intensive control of other modules located far away from one module is excessive and wasteful control from the viewpoint of power distribution across a chip.

The above patent documents cover local power control in units of function units. The techniques described in the above documents allow proper power consumption control in functional units, but no consideration is given to power consumption across an entire chip. In other words, setting an allowable power consumption value of up to an original maximum power consumption to each module will result in power consumption beyond the maximum power consumption across an entire chip.

On the other hand, assume that allowable power consumption lower than an original maximum power consumption is set to each module from the view point of control of the maximum power consumption across an entire chip by means of local power consumption control and trade-off. In this case, individual modules will not be capable of operating at the highest performance at which they have the original maximum power consumption.

In addition, each module usually operates on approximately the average power and the modules as a whole tend to operate on power that is much smaller than the total sum of the allowable powers even if some of the modules operate on set allowable powers. Therefore individual modules may not be capable of perform properly due to power consumption. It is therefore necessary to get the idea of allowing power consumption so that each module can perform sufficiently, taking into power consumption for other modules.

SUMMARY OF THE INVENTION

In the power control of a data processing device according to the present invention, a predetermined power consumption value is defined for each module in the data processing device having, a plurality of modules for processing data. This predetermined power consumption value is defined taking into allowable power values for the plurality of the modules consideration. When, for example, an allowable power value is given to two modules, the predetermined power consumption value is halved.

Each module takes and regards a difference between the predetermined power consumption value and actual power consumption used for data processing as extra power and notifies other modules of extra power thereof.

Each module is designed to be capable of performing data processing below the predetermined power consumption value without using extra power from another module. When notified of extra power by another module, each module can use for maximum data processing electric power that equals to the sum of the predetermined power consumption thereof and the extra power notified thereto.

In power control where the above definitions are applied to processors, a predetermined power consumption value is defined for a processor to execute an instruction. This power is consumed to execute an instruction. Each processor notifies other processors of a difference between a predetermined power consumption value and actual power consumption for instruction execution as extra power.

Each processor performs data processing below the predetermined power consumption value without using extra power from another processor. When notified of extra power by another processor, each processor can use for instruction execution electric power that equals to the sum of the predetermined power consumption thereof and the extra power notified thereto.

Each processor is notified of extra power when decoding or issuing an instruction.

The predetermined power consumption value may be given as a value of power consumed on each cycle or as a value of power consumed on each cycle of a plurality of predetermined values.

According to the present invention, it is possible to provide a semiconductor device as allow each module to perform properly.

BRIEF DESCRIPTION OF THE DRAWINGS

FIG. 5 shows a control truth value table for a power control section according to the second embodiment;

FIG. 11 shows a control truth value table for a power control section according to the fourth embodiment;

FIG. 13 shows a control truth value table for a power control section according to the fifth embodiment;

FIG. 16 shows a control truth value table for a power control section according to an eighth embodiment of the present invention; and FIG. 17 shows a conversion table for expected power consumption and power control signal.

DETAILED DESCRIPTION OF THE PREFERRED EMBODIMENTS

Figure 1:
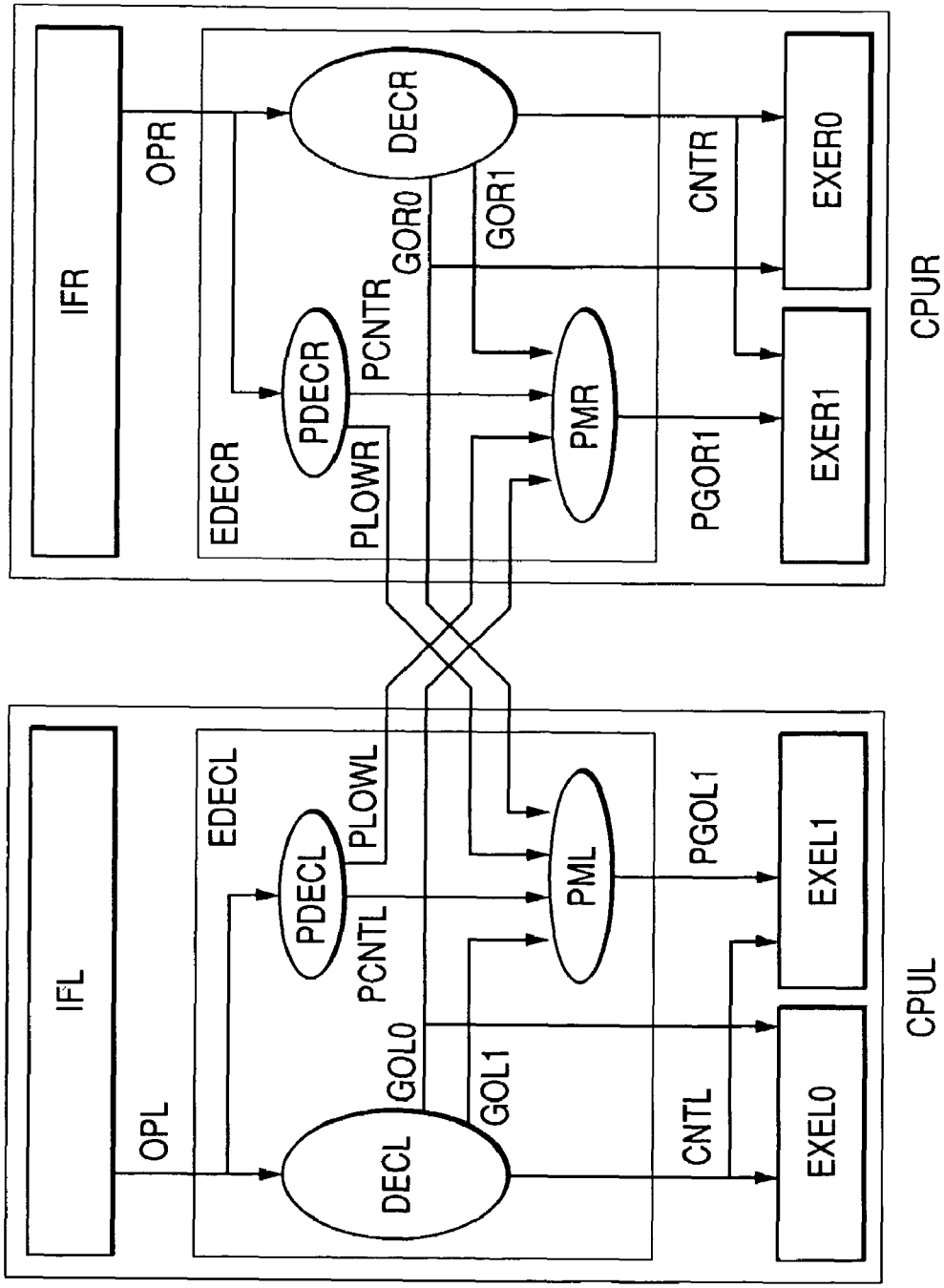
FIG. 1 shows the configuration of a semiconductor device according to a first embodiment of the present invention.

[Outline and Concept of a Power Control Method According to the Present Invention]

Before specific embodiments are described, a description will be made below of the outline and concept of a power control method according to the present invention.

The power control method according to the present invention is based on a control method by which each module determine power consumption therefor and employs a method by which each module determines power consumption therefor taking into account power consumption for each of the surrounding modules. In other words, the power control method according to the present invention controls the total sum of power consumption for one module and power consumptions for the surrounding modules to a level below an allowable power.

A predetermined power consumption value is given for each module. Power below the predetermined power consumption value is considered as a value for power that another module may use as extra power. When given extra power by another module, each module can operate using the predetermined power consumption value therefor and the extra power to operate.

Even when, in addition, each module is not given extra power by another module, power that is equal to a predetermined power consumption value alone is preferentially allocated to each module. Each module can therefore operate in a range below the power allocated, irrespective of the state of other modules.

For power consumption control over a comparatively long unit time, in this case, power consumption can be controlled to a level below allowable power if power consumptions for modules are averaged out within a unit time for control even when each module determines power consumption in response to power consumptions for surrounding modules. On the other hand, each module may be incapable of doing so in a timely manner in response to actual power consumption for these modules because the unit time for power consumption control is comparatively short. If this happens, each module can receive a signal for expected power consumption from another surrounding module and determine power consumption therefor based on the information.

For example, a microprocessor decodes an instruction and determines whether the instruction is executable. The microprocessor, when decoding the instruction, can comprehend power consumption for the instruction as expected power consumption. The microprocessor can notify other processors of the expected power consumption and at the same time receive information on expected power consumptions from processors around the microprocessor. If the microprocessor performs instruction issuance control, such as which instruction to issue or whether no instructions should be issued, based on these expected power consumptions, the microprocessor can control the total sum of the power consumption therefor and power consumptions for surrounding processors to a level below allowable power.

As shown in the above example of the relationship between instruction execution by a microprocessor and power consumption, it is generally possible to predict that much power will be consumed for processing. It is possible to always control the total sum of power consumptions to a level below allowable power based on a prediction. Like the intensive control mentioned above, however, reference to information on all modules in a chip will lead to more power information to be considered and a longer signal propagation distance, thus resulting in possible untimely control during the fast operation of a module. For this reason, each module, in the present invention, considers only power consumptions for surrounding modules for control simplification, thus allowing prediction-based control even if a module is operating fast.

For a processor, power consumption is determined by a required instruction execution resource that depends on the type of an instruction identified as a result of instruction decoding, instruction issuability identified as a result of instruction issue control, data-dependent gate switching probability identified as a result of instruction execution and the like. Information that can be used for fast control is information identified early and accurate control requires all information. In other words, fast control and accurate control are in a trade-off relationship. An increase or decrease in power consumption due to data-dependent gate switching probability is difficult to accurately comprehend when an instruction is executed. For fast control, expected power consumption can therefore be estimated paying attention to instruction type and instruction issue.

If, in addition, allowable power is set to a processor, it is necessary to avoid a state where a setting causes an instruction to remain unissuable, that is, a deadlock state. In particular in the present invention, each module operates while given extra power by another module. It is therefore necessary to prevent one module from being inoperable if the module is not given extra power by another module or to prevent a module itself waiting for extra power from stopping and entering a deadlock state.

For the above reasons, each module according to the present invention is, even when not given extra power by any other module, preferentially allotted at least power corresponding to a predetermined power consumption value. Each module is also designed to be operable in a range below the predetermined power consumption value irrespective of the state of other modules.

Each processor need also be designed to provide surrounding processors with extra power corresponding to a difference between allowable power and expected power consumption in a range at which the processor itself does not enter a deadlock state. Alternatively each processor need be designed to enter a cycle during which the processor always secures power that is necessary to prevent the processor from entering a deadlock state.

If, for example, a processor that can issue a plurality of instructions issues one instruction below allowable power given to the processor, the processor does not enter a deadlock state because it can issue one instruction in the range of the allowable power.

If, on the other hand, the processor issues an instruction that is above allowable power given thereto, the processor cannot issue the instruction and then enters a deadlock state. If, however, the scope where allowable power is set is defined as N cycles (N: an integer equal to or greater than 2), the processor does not enter a deadlock state unless the processor issues an instruction that is above allowable power of N cycles. Assume, for example, that allowable power of 2 cycles is defined as a maximum power of 1 cycle, that is, an average allowable power per cycle is defined as a half of the maximum power. If the processor remains stalled (instruction stop) for a cycle's worth, the processor can issue even an instruction that is above the maximum power. In this way, control can be performed, even if allowable power is set, so that the processor may not enter a deadlock if the scope of allowable power settings is sufficiently expanded in the direction of time axis in response to allowable power.

If two processors cooperate with each other and set allowable power to the total sum of the power consumptions, each of the processors preferentially secures a right to use up to half of the allowable power if each processor can continue to operate on half of the allowable power. None of these processors do enter a deadlock provided that if the power consumption for one processor does not reach half of the allowable power, the other processor is designed to be capable of using allowable power until the total sum of the power consumptions reaches the allowable power.

If, on the other hand, each of the two processors is unable to keep operating on half of the allowable power relative to the two processors, the two processors admit that they take turns using power above half of the allowable power. This allows a deadlock state to be avoided while the allowable power relative to the two processors is kept.

First Embodiment

Figures 2, 3:
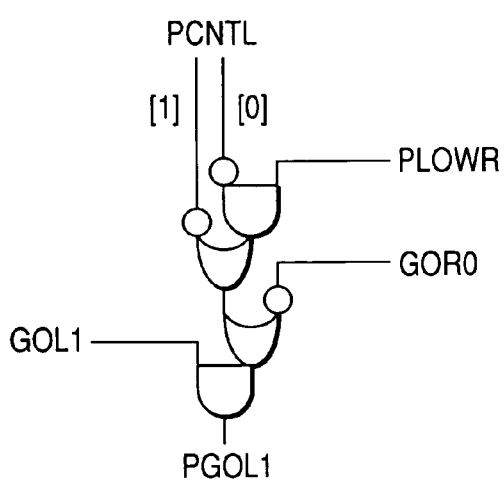
FIG. 2 shows a control truth value table for a power control section according to the first embodiment.
FIG. 3 shows a control logic for the power control section of the first embodiment.

A first embodiment of the present invention will be described below with reference to FIGS. 1 to 3. FIG. 1 shows the configuration of a semiconductor device according to the first embodiment of the present invention. FIG. 2 shows a control truth value table for a power control section according to the first embodiment. FIG. 3 shows a control logic for the power control section of the first embodiment.

In the present embodiment, two processors CPUL and CPUR, each having an equal maximum power consumption, notifies each other of expected power consumption and each processor controls power consumption thereof so that the total sum of power consumptions for each cycle is equal to or less than allowable power. One cycle, as used in the present embodiment, corresponds to one instruction.

In the present embodiment, allowable power for the two processors equals half of the total sum of the maximum power consumptions and each processor keeps operating on half of the maximum power consumption without entering a deadlock state. The maximum power consumption, as used in the present embodiment, refers to logical power consumption when the two processors operate completely independently of each other.

Each of the two processors CPUL and CPUR is a super scholar processor that can issue two instructions at the same time. The maximum power consumption at which the processor issues one instruction is half of the maximum power consumption at which the processor issues two instructions. The maximum power consumption at which the processor issues one instruction is 2. The maximum power consumption at which the processor issues two instructions is 4.

The expected power consumption for each processor is available in four levels: 1, 2, 3, and 4. The total sum of the maximum power consumptions for the two processors is 8. Since the allowable power for the two processors is defined as half of the total sum of the maximum power consumption, the allowable power for the two processors is 4.

To avoid a deadlock state, each processor can secure a preferential right to use power of up to 2, which is half of the allowable power for the two processors, and operate. In other words, each processor can always consume power up to level 2 irrespective of the other processor's operating state.

If the expected power consumption for the other processor is 1, the allowable power for the two processors can be maintained. This is because the power consumption for the two processors is 4 even if the power consumption is increased to 3, a value of power consumption preferentially given to each processor. If, in addition, the other processor does not issue an instruction, one processor can use all of an allowable power of 4, an allowable power value given for the two processors.

An example of the operation of the processor CPUL, shown in FIG. 1, will be described below.

The processor PCUL according to the present invention is composed of an expanded decoding section EDECL, which is made up of a normal instruction decoding section PDECL and additions, a power decoding section PDECL and a power control section PML.

The power decoding section PDECL of the processor CPUL receives an instruction code OPL from an instruction fetch section IFL and determines and outputs expected power consumption as an instruction code PCNTL. If, in addition, the expected power consumption is 1, the power decoding section asserts a signal PLOWL.

The instruction decoding section DECL also receives the instruction code OPL and determines whether an instruction due to a factor other than power can be issued. The instruction decoding section asserts a signal GOL0 if a preceding instruction can be issued and a signal GOL1 if a subsequent instruction can also be issued. Although each processor is a super scholar processor that can issue two instructions at the same time, a preceding instruction operates first and then a subsequent instruction operates on software. The instruction decoding section outputs various control signals CNTL necessary for instruction execution. The power decoding section PDECR and instruction decoding section DECR of the processor CPUR issue PCNTR, PLOWR, GOR0, GOR1, and CNTR as well.

Note that the expected power consumption for each instruction is generally identified by decoding each instruction, while instruction issuability take some time because the issuability is determined depending on how much of a preceding instruction resource is occupied, the availability of instruction execution results and the like. Therefore, note that GOL0, GOL1, GOR0, and GOR1 are time-consuming signals.

The power control section PML determines an instruction that can be issued at the allowable power or below from the signals PCNTL, PLOWR, GOR1, and GOL1 and performs final instruction issue control. PCNTL is a signal showing the above four levels of expected power consumption. PLOWR is a signal showing that the expected power consumption for the other processor (i.e., CPUR) is 1. GOR0 is a signal showing the issuability of the other processor's preceding instruction due to a factor other than power. GOL1 is a signal showing the issuability of the processor (CPUL)'s subsequent instruction due to a factor other than power. Because a preferential right is secured for power consumption up to 2, the processor CPUL can issue a preceding instruction irrespective of the power state of the other processor CPUR. The power control section PML therefore determines whether a subsequent instruction can be issued and asserts a signal PGOL1 if the subsequent instruction can be issued.

Instruction execution sections EXEL0 and EXEL1 then can each execute an instruction according to the instruction execution control signal CNTL when instruction issuability signals GOL0 and GOL1 are asserted. A power control section PMR of the processor CPUR also performs final instruction issue control as well. The power control section asserts signals PGOR0 and PGO1 if an instruction can be issued. Each of instruction execution sections EXER0 and EXER1 then executes an instruction according to the instruction execution control signal CNTR when instruction issuability signals GOR0 and GOR1 are asserted.

Instruction issue control truth values for the power control section PML are as tabulated in FIG. 2.

Four types are available depending on input signal values and type 5, a complementary space (otherwise) for these types, is available.

In type 1, the expected power consumption PCNTL is 2 or less. One processor therefore issues a subsequent instruction without depending on PLOWR and GOR0, state signals for the other processor.

In type 2, the expected power consumption PCNTL is 3. However, the power decoding section of the other processor has already asserted the signal PLOWR and the expected power consumption is 1 or less. The extra power for the other processor is 1 or more and the total sum of expected power consumptions does not exceed the allowable power. One processor therefore issues a subsequent instruction.

In type 3 and type 4, the expected power consumption PCNTL is 3 and 4, respectively. Because the power decoding section of the other processor has not asserted the signal GOR0, the other processor does not issue an instruction and has no power consumption and extra power of 2. The total sum of the expected power consumptions does not exceed the allowable power. One processor therefore issues a subsequent instruction.

Although type 5 has a complementary space for the above four types, the above four types together show all cases where an instruction can be issued. Type 5 therefore corresponds to all cases where no instructions can be issued.

The instruction issue control truth value table for the instruction issue control by the power control section PML represented by control logic is as shown in FIG. 3. In PCNTL, the signal values 0*, 10, and 11 correspond to the values to be represented 2 or less, 3, and 4, respectively. The symbol * shows that either 0 or 1 may be used. As shown, The path from each of the signals that take some time to produce, GOL1 and GOR0, requires just one logic step and is fast.

Second Embodiment

Figure 4:
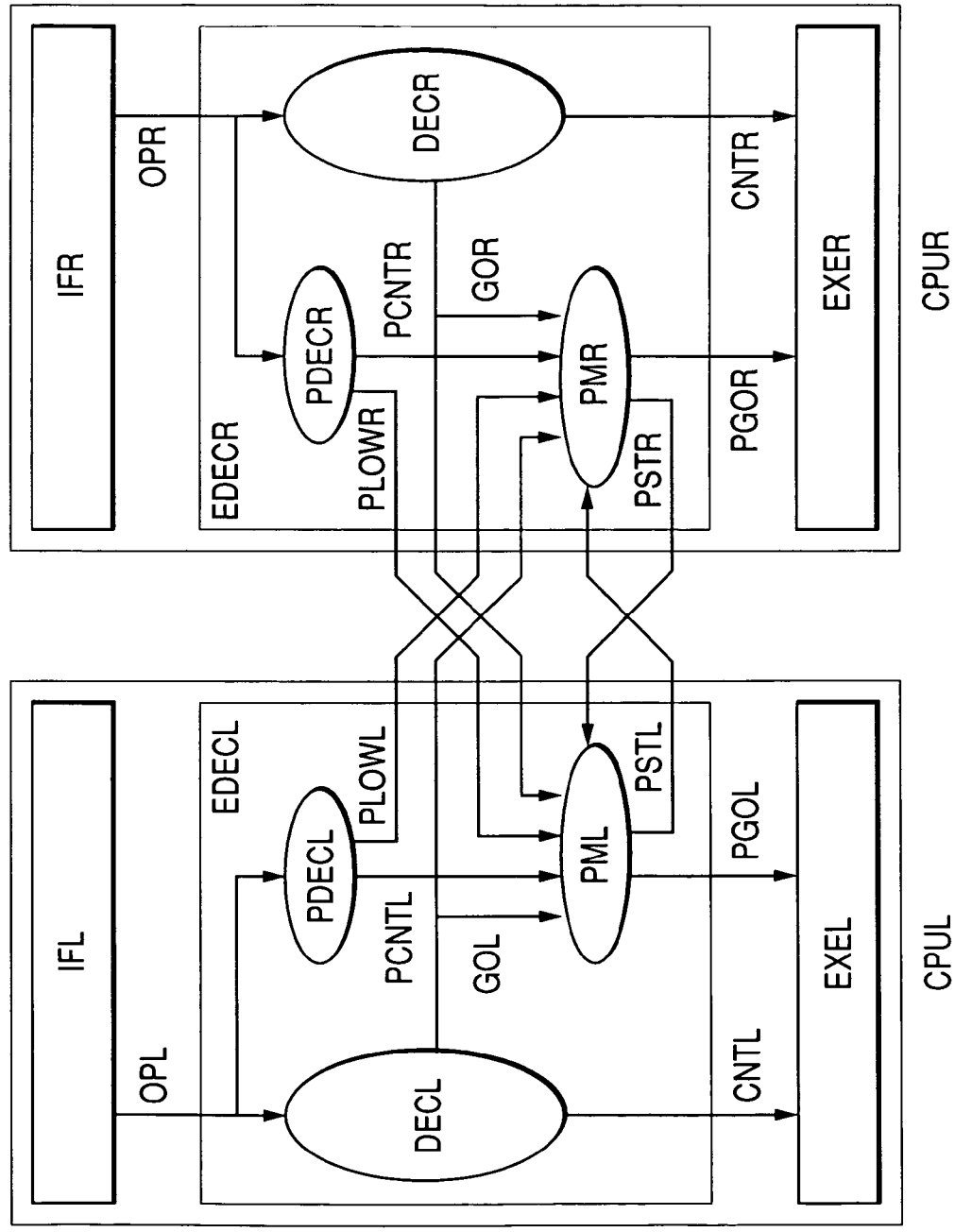
FIG. 4 shows the configuration of a semiconductor device according to a second embodiment of the present invention.
Figure 6:
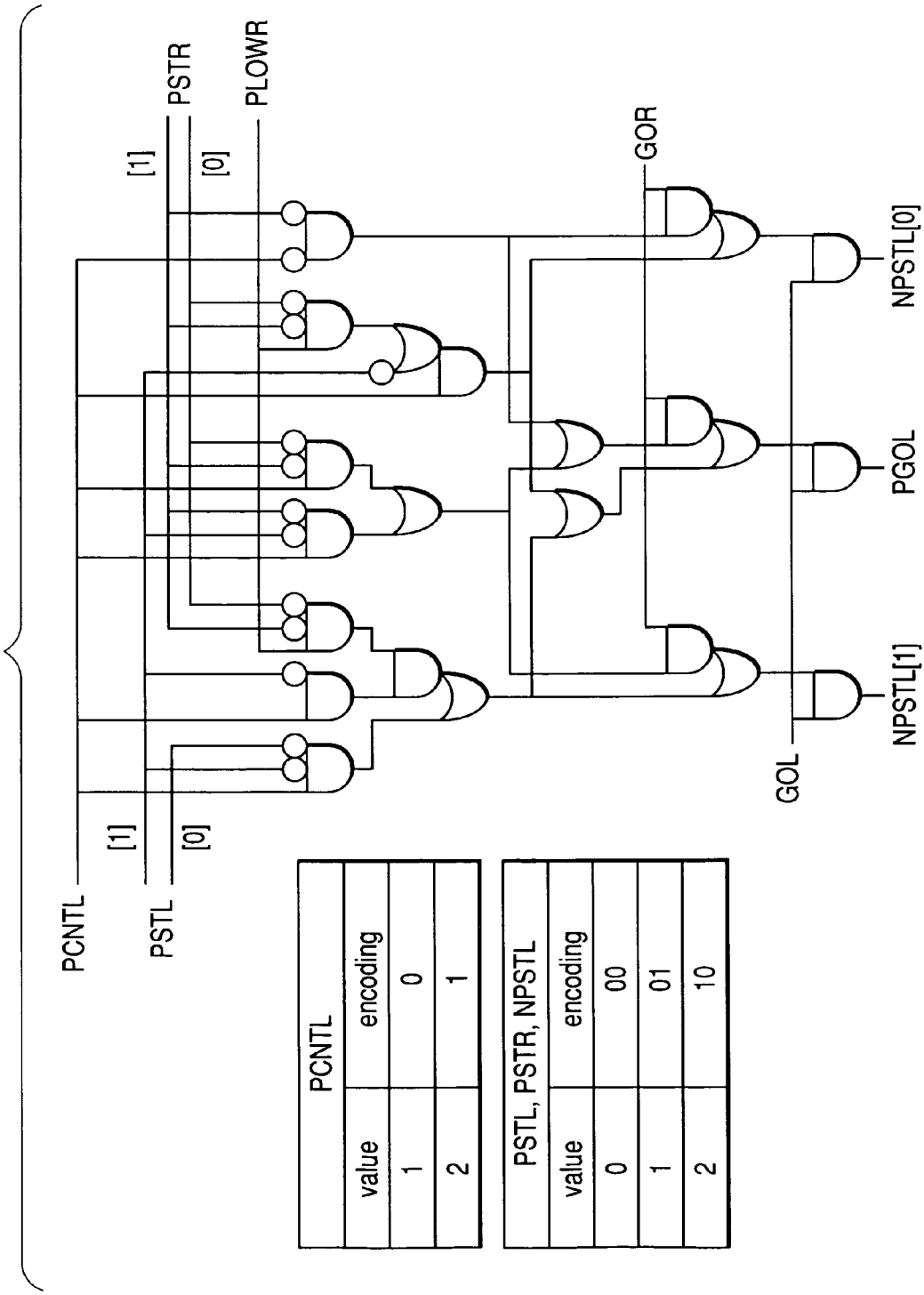
FIG. 6 shows a control logic for the power control section of the second embodiment.

A second embodiment of the present invention will be described below with reference to FIGS. 4 to 6. FIG. 4 shows the configuration of a semiconductor device according to the second embodiment of the present invention. FIG. 5 shows a control truth value table for a power control section according to the second embodiment. FIG. 6 shows a control logic for the power control section of the second embodiment.

In the present embodiment, two processors CPUL and CPUR, each having a equal maximum power consumption, notify each other of expected power consumption and each processor controls power consumption thereof so that the total sum of power consumptions during two cycles for the two processors is equal to or less than allowable power. Further, as with the first embodiment, one cycle, as used in the present embodiment, corresponds to one instruction.

Allowable power for the two processors equals half of the total sum of the maximum power consumptions during two cycles. Each processor is a scholar processor that executes instructions one by one. The maximum power consumption for one instruction is 2.

The expected power consumption for each processor, even during two cycles, is available in two levels: 1 and 2. In this case, the total sum of maximum power consumptions for the two processors during two cycles is 8. The allowable power for the two processors during two cycles is 4.

To avoid a deadlock state, each processor can secure a preferential right to use power of up to 2 during two cycles, and operate.

If the expected power consumption for the other processor is 1 and uses no power during the first cycle, the power consumption during two cycles is 1 or less. Therefore, the allowable power can be maintained even if, during two cycles, one processor uses power of up to 3, a value of power that each processor has been given a preferential right for. If the other processor may not be capable of issuing an instruction during the second cycle and uses no power or power of 1 during the first cycle, the allowable power can be maintained even if one processor use power of 4 or 3 during the second cycle.

An example of the processor CPUL shown in FIG. 4 will be described below.

The power decoding section PDECL of the processor CPUL receives an instruction code OPL from an instruction fetch section IFL. The power decoding section determines and outputs the expected power consumption as a signal PCNTL. The power decoding section further asserts a signal PLOWL if the expected power consumption is 1.

The instruction decoding section DECL also receives the instruction code OPL and determines whether an instruction due to a factor other than power can be issued. The instruction decoding section asserts a signal GOL if an instruction can be issued. The instruction decoding section also outputs various control signals CNTL necessary for instruction execution. The power decoding section PDECR and instruction decoding section DECR of the processor CPUR also receives an instruction code OPR from the instruction fetch section and outputs PCNTR, PLOWR, GOR, and CNTR as well.

The power control section PML of the processor CPUL determines an instruction that can be issued at the allowable power or below from the signals PCNTL, PLOWR, GOL and GOR, and PSTL and PSTR and performs final instruction issue control. PCNTL is a signal showing expected power consumption during two cycles. PLOWR is a signal showing that the expected power consumption for the other processor is 1. GOL is a signal showing whether one processor can issue an instruction due to a factor other than power. GOR is a signal showing whether the other processor (that is, CPUR) can issue an instruction due to a factor other than power. Each of the signals PSTL and PSTR is a signal showing power consumption during a preceding cycle. The power control section then asserts a signal PGOL if an instruction can be issued.

The instruction execution section EXEL then executes an instruction according to the instruction execution control signal CNTL when the signal GOL is asserted. The power control section PMR of the processor, CPUR also performs final instruction issue control as well and asserts the signal PGOR if an instruction can be issued. The instruction execution section EXER then executes an instruction according to the instruction execution control signal CNTR when the signal GOR is asserted.

Instruction issue control truth values for the power control section PML are as tabulated in FIG. 5.

Seven types are available depending on input signal values and type 8, a complementary space (otherwise) for these types, is available.

In type 1, the expected power consumption PCNTL is 1 and the power consumption is 1 or less during the first cycle. Therefore, the power for which each processor has a preferential right to use during two cycles is 2 or less. Thus, one processor issues an instruction without depending on PLOWR and GOR, state signals for the other processor.

In type 2, the expected power consumption PCNTL is 1. The power decoding section of the other processor has already asserted the signal PLOWR and the expected power consumption is 1 or less. In addition, the power consumption during the first cycle is 0. Therefore, an instruction is issued using the other processor's extra power of 1.

In type 3, the expected power consumption PCNTL is 1 and the power consumption during the fist cycle for the other processor is 1 or less. During the second cycle, the power decoding section of the other processor does not assert the signal GOR and the other processor does not issue an instruction. Therefore, one processor issues an instruction using the other processor's extra power of 1 or more.

In type 4, the expected power consumption PCNTL is 2 and the power consumption during the first cycle is 0. Therefore, the power for which each processor has a preferential right to use during two cycles is 2. Thus, one processor issues an instruction irrespective of PLOWR and GOR, state signals for the other processor.

In type 5, the expected power consumption PCNTL is 2 and the power consumption during the first cycle is 1. If, therefore, the extra power for the other processor is 1 or more, this extra power plus the power for which each processor has a preferential right, 2, makes at least 3, which means the total power for one processor. Therefore, one processor can issue an instruction. The power decoding section of the other processor has already asserted the signal PLOWR and the expected power consumption for the other processor is 1 or less. In addition, the power consumption during the first cycle is 0. Thus, the extra power for one processor is 1 and one processor issues an instruction.

In type 6, one processor can issue an instruction if the extra power for the other processor is 1 or more as with in type 5. The power consumption during the first cycle for the other processor is 1 or less. During the second cycle, the power decoding section of the other processor does not assert the signal GOR and the other processor does not issue an instruction. Thus, the extra power for one processor is 1 and one processor issues an instruction.

In type 7, the expected power consumption PCNTL is 2 and the power consumption during the first cycle for the other processor is 0. During the second cycle, the power decoding section of the other processor does not assert the signal GOR and the other processor does not issue an instruction. Thus, one processor issues an instruction using the other processor's extra power of 2.

Although type 8 has a complementary space for the above seven types, the above seven types together show all cases where an instruction can be issued. Type 8 therefore corresponds to all cases where no instructions can be issued.

Note that NPSTL in the OUTPUT column refers to PSTL during next two cycles.

The instruction issue control truth value table for the instruction issue control by the power control section PML represented by control logic is as shown in FIG. 6.

In PCNTL, the signal values 1 and 2 correspond to the values to be represented 1 and 2, respectively. For PSTL, PSTR and NPSTL, the signal values correspond to the values to be represented. As shown, The paths from the signals that take some time to produce, GOR and GOR, requires just two logic steps and one logic step, respectively, and are fast.

Third Embodiment

Figure 7:
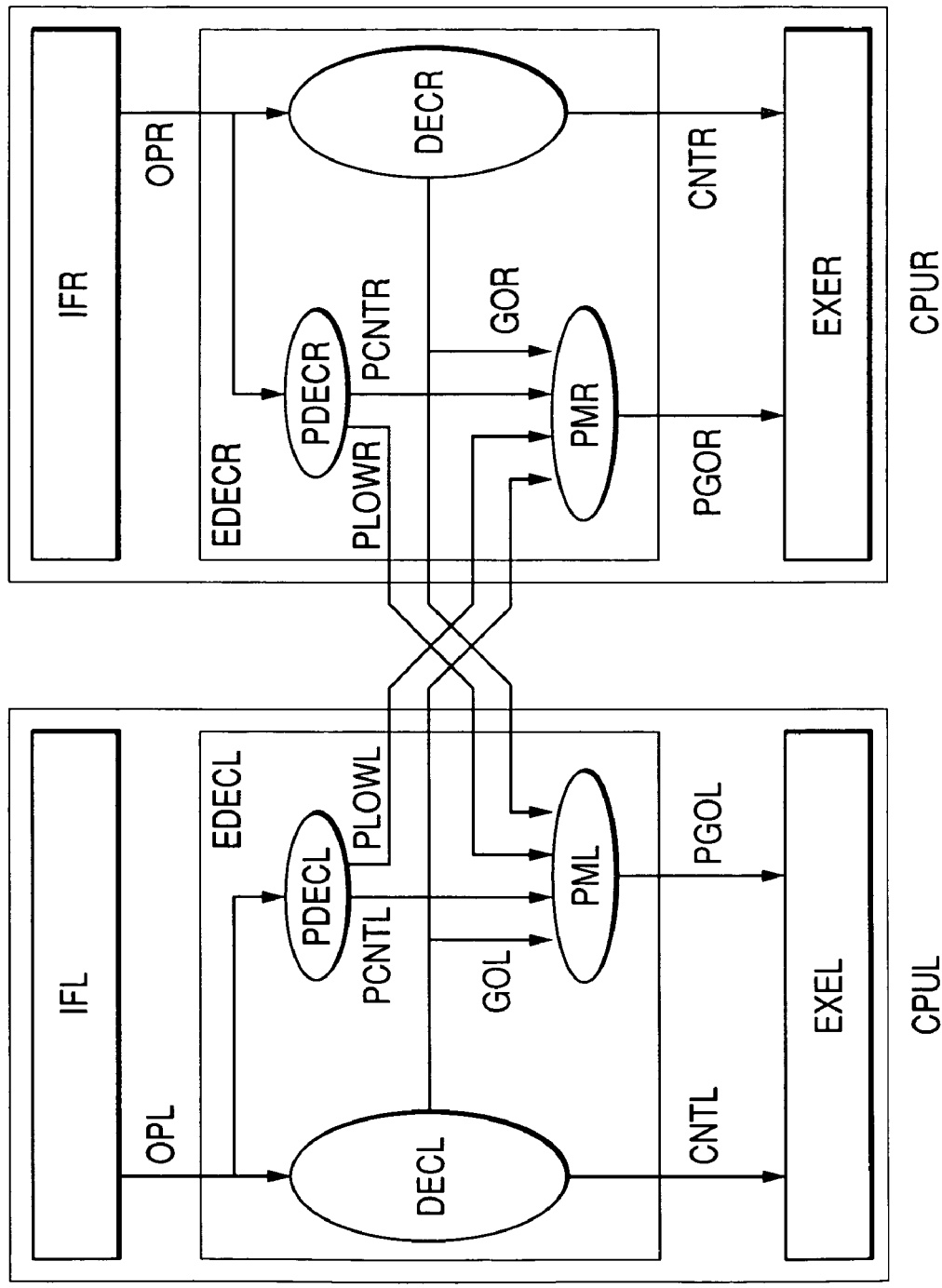
FIG. 7 shows the configuration of a semiconductor device according to a third embodiment of the present invention.
Figures 8, 9:
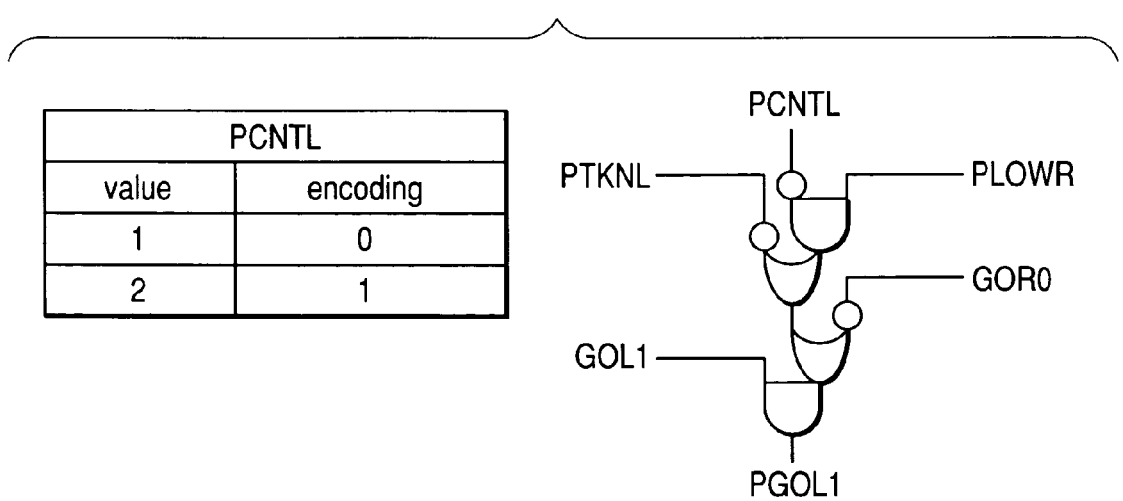
FIG. 8 shows a control truth value table for a power control section according to the third embodiment.
FIG. 9 shows a control logic for the power control section of the third embodiment.

A third embodiment of the present invention will be described below with reference to FIGS. 7 to 9. FIG. 7 shows the configuration of a semiconductor device according to the third embodiment of the present invention. FIG. 8 shows a control truth value table for a power control section according to the third embodiment. FIG. 9 shows a control logic for the power control section of the third embodiment.

In the present embodiment is, as with the first embodiment, two processors CPUL and CPUR, each having an equal maximum power consumption, notifies each other of expected power consumption and each processor controls power consumption thereof so that the total sum of power consumptions during each cycle may be equal to or less than allowable power. In the present embodiment, each processor is a scholar processor that executes instructions one by one. The maximum power consumption at which the processor issues one instruction is 2. The allowable power for the two processors is equal to half of the total sum of the maximum power consumptions. To keep operating without entering a deadlock state, either of the two processors obtains a preferential right and can preferentially execute an instruction during each cycle.

The expected power consumption for each processor is available in two levels: 1 and 2. The total sum of the maximum power consumptions for the two processors is 4 and the allowable power for the two processors is 2. If the expected power consumption for the other processor is 1, one processor can execute an instruction with the expected power consumption of 1 while maintaining the allowable power even if one processor does not have a preferential right. If, in addition, the other processor cannot issue an instruction, one processor can use all of the allowable power of 2 even if one processor does not have a preferential right.

An example of the operation of the processor CPUL, shown in FIG. 7, will be described below.

The power decoding section PDECL of the processor CPUL receives an instruction code OPL from an instruction fetch section IFL and determines and outputs expected power consumption as a signal PCNTL. If, in addition, the expected power consumption is 1, the power decoding section asserts a signal PLOWL. The instruction decoding section DECL also receives the instruction code OPL and determines whether an instruction due to a factor other than power can be issued. The instruction decoding section asserts a signal GOL if an instruction can be issued. The instruction decoding section also outputs various control signals CNTL necessary for instruction execution. The power decoding section PDECR and instruction decoding section DECR of the processor CPUR issue PCNTR, PLOWR, GOR, and CNTR as well.

The power control section PML determines an instruction that can be issued at the allowable power or below from the signals PCNTL, PLOWL, GOL, GOR, and PTKNL and performs final instruction issue control. PCNTL is a signal showing two levels of expected power consumption. PLOWR is a signal showing that the expected power consumption for the other processor is 1. GOL is a signal showing the issuability of one processor's instruction due to a factor other than power. GOR is a signal showing the issuability of the other processor's instruction due to a factor other than power. PTKNL is a signal showing a preferential cycle during which either of the two computers has a preferential right. The power control section PML then asserts a signal PGOL if an instruction can be issued. The instruction execution sections EXEL then executes an instruction according to the instruction execution control signal CNTL when the signal GOL is asserted.

The power control section PMR of the processor CPUR performs final instruction issue control as well. The power control section asserts a signal PGOR if an instruction can be issued. The instruction execution section EXER executes an instruction according to the instruction execution control signal CNTL when the signal GOR is asserted.

Instruction issue control truth values for the power control section PML are as tabulated in FIG. 8.

Three types 1 to 3 are available depending on input signal values and type 4, a complementary space (otherwise) for these types, is available.

In type 1, PTKNL, a signal showing a preferential cycle, has already been asserted and one processor issues an instruction, irrespective of PLOWR and GOR0, state signals for the other processor.

In type 2, the expected power consumption for one processor is 1 as shown under PCNTL. The expected power consumption for the other processor is 1 or less because the signal PLOWR has already been asserted. Thus, the total sum of the expected power consumptions does not exceed the allowable power and one processor issues an instruction, whether or not one processor has a preferential right.

In type 3, the power decoding section of the other processor has not asserted the signal GOR. Therefore, the other processor does not issue an instruction and the power consumption for the other processor is 0. Thus, the total sum of the expected power consumptions does not exceed the allowable power and one processor issues an instruction, whether or not one processor has a preferential right.

Although type 4 has a complementary space for the above three types, the above three types together show all cases where an instruction can be issued. Type 4 therefore corresponds to all cases where no instructions can be issued.

The instruction issue control truth value table for the instruction issue control by the power control section PML represented using a control logic diagram is as shown in FIG. 9.

In PCNTL, the signal values 0 and 1 correspond to the values to be represented, 1 and 2, respectively. As shown, the path from each of the signals, GOR0 and GOR1, that take some time to produce, requires just one logic step and is fast.

Fourth Embodiment

Figure 10:
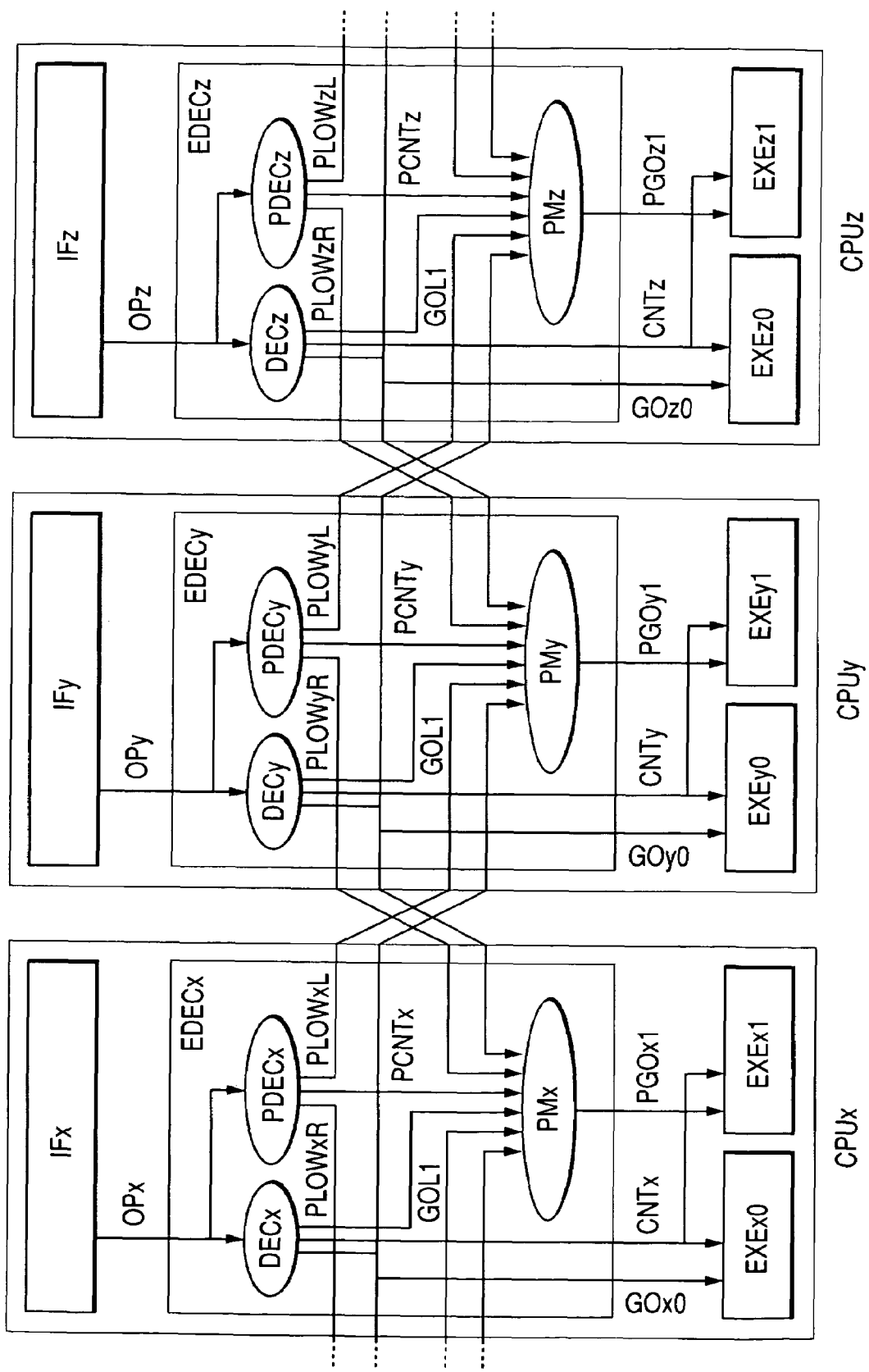
FIG. 10 shows the configuration of a semiconductor device according to a fourth embodiment of the present invention.

A fourth embodiment of the present invention will be described below with reference to FIGS. 10 and 11. FIG. 10 shows the configuration of a semiconductor device according to the fourth embodiment of the present invention. FIG. 11 shows a control truth value table for a power control section according to the fourth embodiment.

In the present embodiment, n processors CPU0 to CPUn, each having an equal maximum power consumption, notify adjacent processors thereof of expected power consumption and each processor controls power consumption thereof so that the total sum of power consumptions during each cycle may be equal to or less than allowable power.

FIG. 10 shows three consecutive processors CPUx, CPUy, and CPUz of the n processors. Defining the operation of the processor in the middle, CPUy, makes it possible to define the operation of a processor except processors on both sides in any set of three consecutive processors. For the processors on both sides, the processor CUPy can obtain extra power from only one of the processors on the right and left and operates as a subset of the other processors. Alternatively, the processors on both sides are very likely to be located around a chip and at positions where they can be easily powered. It is therefore possible to cause each of these processors to receive a signal from a processor next to the processor if the adjacent processor virtually does not operate, and to operate in the same way as the adjacent processor.

In the present embodiment, the allowable power for the three processors is half of the total sum of the maximum power consumptions for the three processors. Each processor can operate without entering a deadlock state if the power that the processor uses is half of the maximum power consumption. To meet the above requirements, each of the n processors is a super scholar processor that can issue two instructions at the same time. The maximum power consumption at which the processor issues one instruction is half of the maximum power consumption at which the processor issues two instructions. The maximum power consumption at which the processor issues one instruction is 4 while the maximum power consumption at which the processor issues two instructions is 8.

The expected power consumption for each processor is available in eight levels: 1 to 8. The maximum power consumption per processor is 8 while the allowable power per processor is 4. To avoid a deadlock state, each processor can secure a preferential right to use power of up to 4, which is half of the maximum power consumption per processor and operate.

An example of the operation of the processor CPUy, shown in FIG. 10, will be described below.

The power decoding section PDECy receives an instruction code OPy from an instruction fetch section IFy and determines and outputs expected power consumption as a signal PCNTy. In addition, the power decoding section asserts a signal PLOWyL and a signal PLOWyR if the expected power consumption is 3 or less and 2 or less, respectively. In other words, the power decoding section asserts only the signal PLOWyL and both signals PLOWyL and PLOWyR if the expected power consumption is 3 and 2 or less, respectively.

The signals PLOWyL and PLOWyR show that the processor in the middle can, because of the low expected power consumption therefor, give some of the extra power thereof to the processors on the right and on the left, respectively. When, in addition, the expected power consumption for the processor in the middle is 3, the processor in the middle can give an expected power consumption of 1 to the processor CUPZ. When the expected power consumption for the processor CUPy is 2 or less, the processor in the middle gives an expected power consumption of 1 to each of both processors CPUx and CPUZ. For better symmetry, the power decoding section PDECy can assert alternately the signals PLOWyL and PLOWyR if the expected power consumption for the processor CPUy is 3.

The instruction decoding section DECy of the processor CPUy also receives the instruction code OPy and determines whether an instruction due to a factor other than power can be issued. The instruction decoding section asserts a signal GOy0 if a prior instruction can be issued and a signal GOy1 if a post instruction can also be issued. The instruction decoding section also outputs various control signals CNTL necessary for instruction execution. The instruction decoding section for each of the processors CPUx and CPUZ also operates in the same manner as the instruction decoding section for the processor CPUy.

The power control section PMy determines an instruction that can be issued at the allowable power or below from the signals PCNTy, PLOWxL and PLOWzR, GOx0 and Goz0, and GOy1 and performs final instruction issue control. PCNTy is a signal showing eight levels of expected power consumption. PLOWxL and PLOWzR are signals showing an extra power of 1 from the adjacent processors on the right and left, respectively. Gox0 and Goz0 are signals showing the issuability of the right and left processors' prior instructions due to a factor other than power. GOy1 is a signal showing the issuability of the processor (CPUy)'s post instruction due to a factor other than power.

The processor UPUY secures a preferential right to use a power of up to 4 and can issue a prior instruction irrespective of the power state of the processors on the right and left. The power control section PMy therefore determines whether a post instruction can be issued and asserts a signal PGOy1 if a post instruction can be issued. Instruction execution sections EXEy0 and EXEy1 then can each execute an instruction according to the instruction execution control signal CNTy after the assertion of instruction issuability signals GOy0 and PGOy1, respectively.

Instruction issue control truth values for the power control section PMy are as tabulated in FIG. 11.

Twelve types 1 to 12 are available depending on input signal values and type 13, a complementary space (otherwise) for these types, is available.

In type 1, the expected power consumption for the processor in the middle is 4 or less as shown under PCNTy. The processor CPUy issues a subsequent instruction irrespective of the states of the adjacent processors on the right and left.

In types 2 to 5, the expected power consumption for the processor CPUy is 5 as shown under PCNTy. The power for which the processor CPUy has a preferential right is 4 and not sufficient. The processor CPUy needs to obtain an extra power of 1 from either of the adjacent processors on the right and left.

In type 2, the left processor CPUx has extra power and the signal PLOWxL has already been asserted.

In type 3, the right processor CPUz has extra power and the signal PLOWZR has already been asserted.

In type 4, the left processor CPUx does not execute an instruction and the signal Gox0 has not been asserted.

In type 5, the right processor CPUz does not execute an instruction and the signal GOz0 has not been asserted. In types 2 to 5, as described above, the processor CPUy can obtain an extra power of 1 or more from at least either of the right and left processors. Therefore, the processor CPUy can secure an expected power consumption of 5 and issues a post instruction.

In types 6 to 8, the expected power consumption for the processor CPUy is 6 as seen under PCNTy. The power for which the processor CPUy has a preferential right is 4 and not sufficient. The processor CPUy needs to obtain an extra power of 2 from either of the adjacent processors on the right and left.

In type 6, both of the right and left processors CPUx and CPUz have extra power and the signals PLOWxL and PLOWzR have already been asserted.

In type 7, the left processor CPUx does not execute an instruction and the signal GOx0 has not been asserted.

In type 8, the right processor CPUz does not execute an instruction and the signal GOz0 has not been asserted.

In types 2 to 5 , as described above, the processor CPUy can obtain a total extra power of 2 or more from the right and left processors. Therefore, the processor CPUy can secure an expected power consumption of 6 and issues a post instruction.

In types 9 to 11, the expected power consumption for the processor CPUy is 7 as seen under PCNTy. The power for which the processor CPUy has a preferential right is 4 and not sufficient. The processor CPUy needs to obtain an extra power of 3 from the adjacent processors on the right and left. In type 9, the left processor CPUx has extra power and the signal PLOWxL has already been asserted. In addition, the right processor CPUz does not execute an instruction and the signal GOz0 has not been asserted.

In type 10, the right processor CPUz has extra power and the signal PLOWzL has already been asserted. In addition, the left processor CPUx does not execute an instruction and the signal GOx0 has not been asserted.

In type 11, neither of the right and left processors CPUx and CPUZ executes an instruction and neither of the signals GOx0 and GOz0 has been asserted.

In types 9 to 11, as described above, the processor CPUy can obtain a total extra power of 3 or more from the right and left processors. Therefore, the processor CPUy can secure an expected power consumption of 7 and issues a post instruction. In type 12, the expected power consumption for the processor CPUy is 8 as shown under PCNTy. The power for which the processor CPUy has a preferential right is 4 and not sufficient. The processor CPUy needs to obtain an extra power of 4 from the adjacent processors on the right and left.

Neither of the right and left processors CPUx and CPUz executes an instruction and neither of the signals GOx0 and GOz0 has been asserted. Therefore, the processor CPUy can obtain a total extra power of 4 from the right and left processors. Thus, the processor CPUy can secure an expected power consumption of 8 and issues a post instruction.

Although type 13 has a complementary space for the above twelve types, the above twelve types together show all cases where an instruction can be issued. Type 13 therefore corresponds to all cases where no instructions can be issued. As in the first to the third embodiment, an issue control logic diagram can be configured from the truth value table in FIG. 11.

Fifth Embodiment

Figure 12:
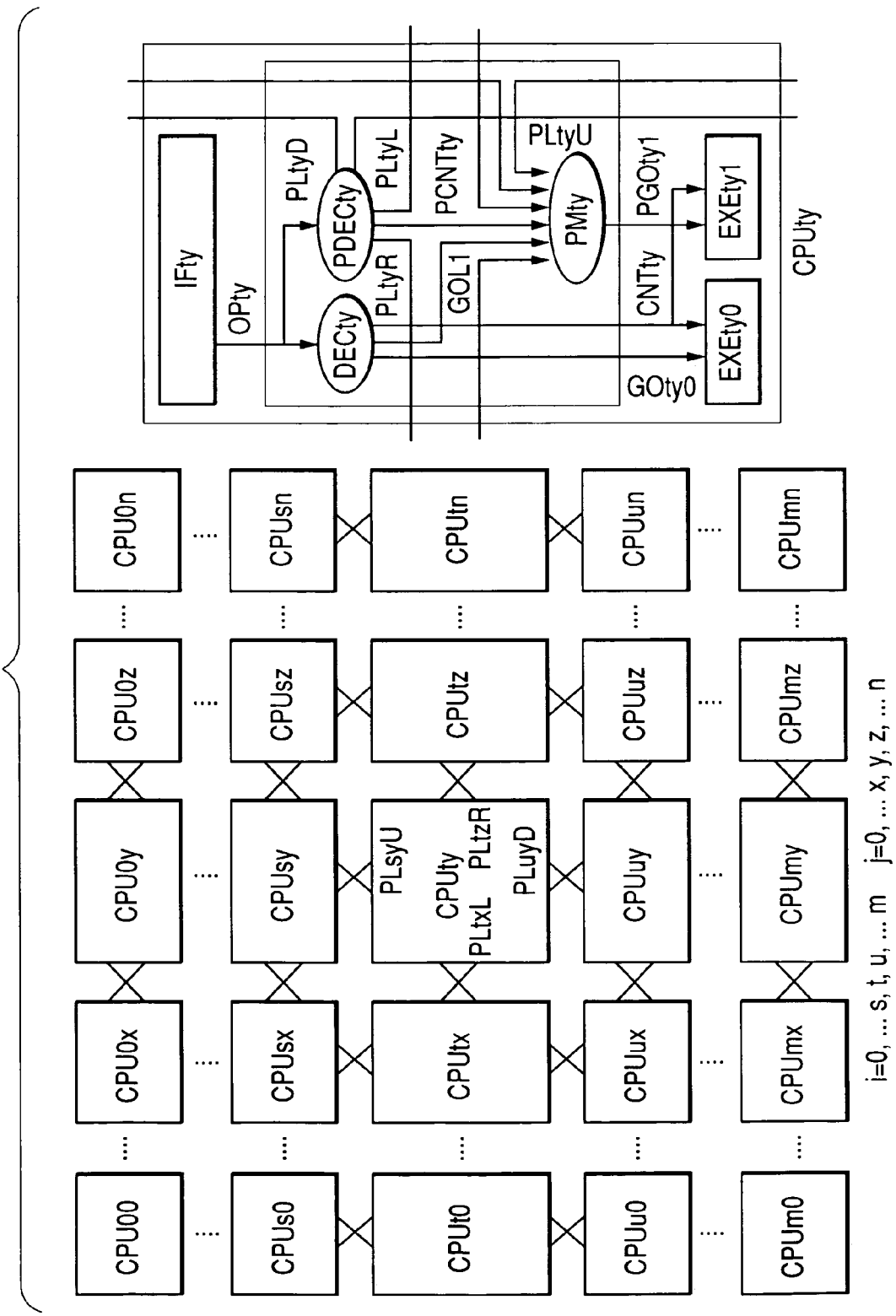
FIG. 12 shows the configuration of a semiconductor device according to a fifth embodiment of the present invention.

A fifth embodiment of the present invention will be described below with reference to FIGS. 12 and 13. FIG. 12 shows the configuration of a semiconductor device according to the fifth embodiment of the present invention. FIG. 13 shows a control truth value table for a power control section according to the fifth embodiment.

The present embodiment is an example showing that m×n processors CPU00 to CPUmn, each having an equal maximum power consumption, notifies adjacent processors on the top and bottom and on the right and left of expected power consumption and that each processor controls power consumption thereof so that the total sum of power consumptions during each cycle is equal to or less than allowable power.

FIG. 12 shows the connection relationship between m×n processors and 3×3 consecutive processors CPUsx to CPUuz and the details of a processor CPUty. Defining the operation of the processor in the middle, CPUty, makes it possible to define the operation of a processor in the middle except the processors around the processor in the middle in any set of 3×3 consecutive processors. Each of the processors around the processor in the middle can obtain extra power only from the processor in the middle and operates as a subset of the other processors. Alternatively, the processors around the processor in the middle are very likely to be located around a chip and where they can be easily powered. It is therefore possible to cause each of these processors to receive a signal from a processor next to the processor if the adjacent processor virtually does not operate, and to operate in the same way as the adjacent processor.

In the present embodiment, the allowable power per processor is half of the maximum power consumption per processor. Each processor can operate without entering a deadlock state if the power that the processor uses is half of the maximum power consumption. To meet the above requirement, each of the m×n processors is a super scholar processor that can issue two instructions at the same time. The maximum power consumption at which the processor issues one instruction is half of the maximum power consumption at which the processor issues two instructions. The maximum power consumption at which the processor issues one instruction is 4 while the maximum power consumption at which the processor issues two instructions is 8.

The expected power consumption for each processor is available in eight levels: 1 to 8. The maximum power consumption per processor is 8 while the allowable power per processor is 4. To avoid a deadlock state, each processor can secure a preferential right to use power of up to 4, which is half of the maximum power consumption per processor and operate.

An example of the operation of the processor CPUty, shown in FIG. 12, will be described below.

The power decoding section PDECty of the processor CPUty receives an instruction code OPty from an instruction fetch section IFty and determines and outputs expected power consumption as a signal PCNTty. In addition, the power decoding section asserts a signal PLtyL, a signal PLtyR, a signal PLtyU, and a signal PLtyD if the expected power consumption is 3 or less, 2 or less, 1 or less, and 0, respectively. In other words, the power decoding section asserts only the signal PLtyL if the expected power consumption is 3, PLtyL and PLtyR if the expected power consumption is 2 or less, PLtyL, PLtyR, and PLtyU if the expected power consumption is 1 or less, PLtyL, PLtyR, PLtyU, and PLtyD if the expected power consumption is 0.

The signals PLtyD, PLtyU, PLtyR, and PLtyL show that the processor in the middle can, because of the low expected power consumption therefor, give an extra power of 1 to the processors on the right, on the left, on the top, and on the bottom, respectively.

The instruction decoding section DECty also receives the instruction code OPty and determines whether an instruction due to a factor other than power can be issued. The instruction decoding section asserts a signal GOty0 if a preceding instruction can be issued and a signal GOty1 if a subsequent instruction can also be issued. The instruction decoding section also outputs various control signals CNTty necessary for instruction execution. The instruction decoding section for each of the other processors also operates in the same manner as the instruction decoding section for the processor in the middle.

The power control section PMty determines an instruction that can be issued at the allowable power or below from the signals PCNty, PLtyU, PLtyD, PLtyL, PLtyR, and GOty1 and performs final instruction issue control. PCNty is a signal showing eight levels of expected power consumption. PLtyU, PLtyD, PLtyL, and PLtyR are signals showing an extra power of 1 from the adjacent processors on the top, on the bottom, on the left, and on the right, respectively. GOty1 is a signal showing the issuability of a subsequent instruction of the processor in the middle due to a factor other than power.

The processor in the middle secures a preferential right to use a power of up to 4 and can issue a preceding instruction irrespective of the power state of the other processors. The power control section PMty therefore determines whether a subsequent instruction can be issued and asserts a signal PGOty1 if the subsequent instruction can be issued. Instruction execution sections EXEty0 and EXEty1 then can each execute an instruction according to the instruction execution control signal CNTty after the assertion of instruction issuability signals GOty0 and PGOty1, respectively.

Instruction issue control truth values for the power control section PMty are as shown in FIG. 13.

Sixteen types 1 to 16 are available depending on input signal values and type 17, a complementary space (otherwise) for these types, is available.

In type 1, the expected power consumption for the processor CPUty is 4 or less as shown under PCNTty. The processor CPUty issues a subsequent instruction irrespective of the states of the adjacent processors on the right and left.

In types 2 to 5, the expected power consumption for the processor CPUty is 5 as shown under PCNTty. The power for which the processor CPUty has a preferential right is 4 and not sufficient. The processor CPUty need obtain an extra power of 1 from one of the adjacent processors.

In types 2 to 5, each of the signals PLsyU, PLuyD, PLtxL, and PLtzR has already been asserted and the processor CPUty can obtain an extra power of 1 or more from at least one of the top, bottom, right, and left processors CPUsy, CPUuy, CPUtx, and CPUtz. Therefore, the processor CPUty can secure an expected power consumption of 5 and issues a subsequent instruction.

In type 6 to 11, the expected power consumption for the processor CPUty is 6 as seen under PCNTty. The power for which the processor CPUty has a preferential right is 4 and not sufficient. The processor CPUty need obtain an extra power of 2 from one of the adjacent processors. In types 6 to 11, at least two of the signals PLsyU, PLuyD, PLtxL, and PLtzR have already been asserted and the processor CPUty can obtain an extra power of 2 or more from at least two of the top, bottom, right, and left processors CPUsy, CPUuy, CPUtx, and CPUtz. Therefore, the processor CPUty can secure an expected power consumption of 6 and issues a subsequent instruction.

In type 12 to 15, the expected power consumption for the processor CPUty is 7 as seen under PCNTty. The power for which the processor CPUty has a preferential right is 4 and not sufficient. The processor CPUty need obtain an extra power of 3 from some of the adjacent processors.

In types 12 to 15, at least three of the signals PLsyU, PLuyD, PLtxL, and PLtzR have already been asserted and the processor CPUty can obtain a total extra power of 3 or more from at least three of the top, bottom, right, and left processors CPUsy, CPUuy, CPUtx, and CPUtz. Therefore, the processor CPUty can secure an expected power consumption of 7 and issues a subsequent instruction.

In type 16, the expected power consumption for the processor CPUty is 8 as seen under PCNTty. The power for which the processor CPUty has a preferential right is 4 and not sufficient. The processor CPUty need obtain an extra power of 4 from some of the adjacent processors. In types 16, all of the signals PLsyU, PLuyD, PLtxL, and PLtzR have already been asserted and the processor CPUty can obtain a total extra power of 4 from all of the top, bottom, right, and left processors CPUsy, CPUuy, CPUtx, and CPUtz. Therefore, the processor CPUty can secure an expected power consumption of 8 and issues a subsequent instruction.

Although type 17 has a complementary space for the above 16 types, that show all cases where an instruction can be issued. Type 17 therefore corresponds to all cases where no instructions can be issued.

As in the first to the third embodiments, an issue control logic diagram can be configured from the truth value table in FIG. 13.

Unlike the first to the fourth embodiment, the present embodiment avoids referencing the instruction issue signals (represented as GOxx) that take some time to produce in the power control of the other processors, thus facilitating providing a faster processor in the middle.

In other words, the present invention places an emphasis on providing a faster processor in the middle by collecting as much extra power as possible from the processors around the processor in the middle. If, for example, it is foreseen, as in load data waiting, that the processor in the middle cannot issue instructions during two or more cycles, instruction issue halt information starting during the second cycle can be reflected in the signals PLsyU, PLuyD, PLtxL, and PLtzR. For information on instruction issue halts that can be determined quickly, such as invalid instructions and simple resource competition, such information starting during the first cycle can be reflected in the signals PLsyU, PLuyD, PLtxL, and PLtzR. In other words, the other processors can be notified of expected power consumption during an early cycle.

Sixth Embodiment

Figure 14:
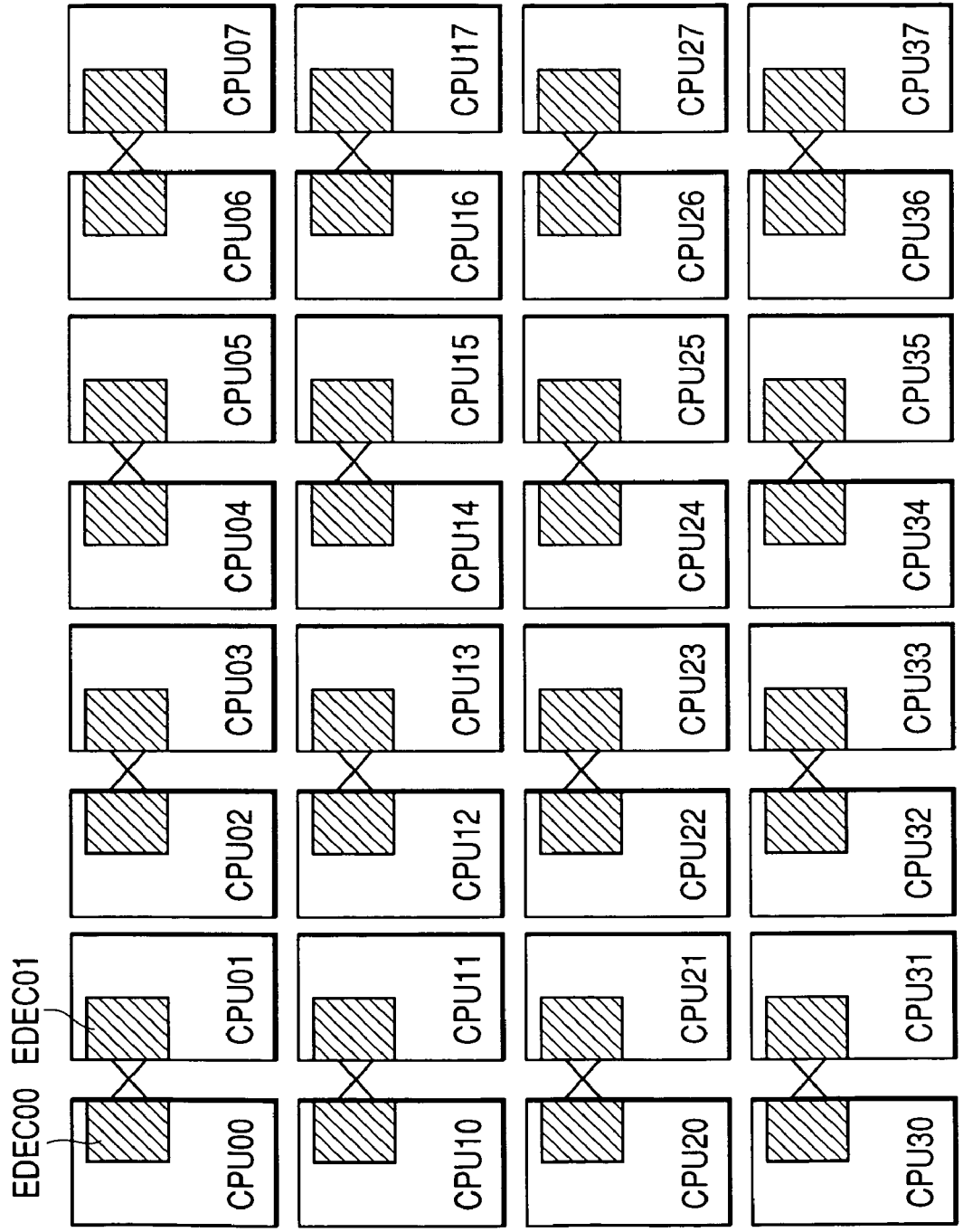
FIG. 14 shows the configuration of a semiconductor device according to a sixth embodiment of the present invention.

A sixth embodiment of the present invention will be described below with reference to FIG. 14. FIG. 14 shows the configuration of a semiconductor device according to the sixth embodiment of the present invention.

In the present embodiment, as in the first to third embodiments, a total allowable power is set for every two adjacent processors. Pairs of two processors controlling power consumption are arranged in an array to configure a processor array.

In the fifth embodiment, the processor in the middle collects a little extra power from each of the four adjacent processors. Thus the fifth embodiment is efficient but there is a concern that longer wiring might run. In contrast, the present embodiment uses two processors concerned in each pair and, as shown in FIG. 14, the expanded decoding sections EDEC00 and EDEC01 of two processors CPU00 and CPU01, can be arranged adjacent to and close to each other. As a result, shorter wiring runs, thus facilitating making the processors operate fast.

Seventh Embodiment

Figure 15:
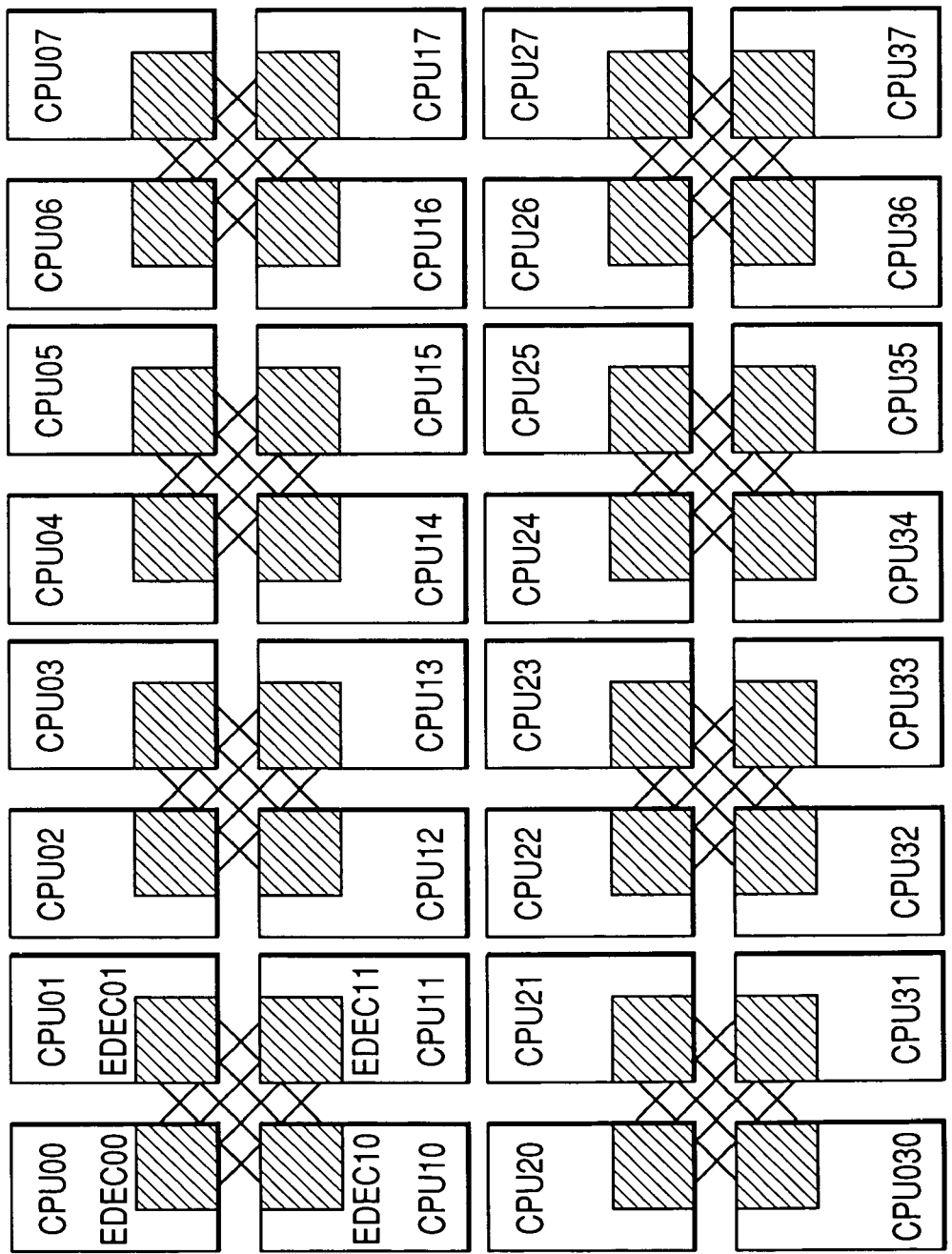
FIG. 15 shows the configuration of a semiconductor device according to a seventh embodiment of the present invention.

A seventh embodiment of the present invention will be described below with reference to FIG. 15. FIG. 15 shows the configuration of a semiconductor device according to the seventh embodiment of the present invention.

In the fifth embodiment, the processor in the middle collects a little extra power from each of the adjacent processors on the top, bottom, right and left. In the present embodiment, each of four processors in each group collects a little extra power from the other processors in the same group. As shown in FIG. 15, it is possible to arrange the expanded decoding sections EDEC00, EDEC01, EDEC10, and EDEC1 of the four processors CPU00, CPU01, CPU10, and CPU11 adjacent to one another. As a result, shorter wiring runs, thus facilitating making the processors operate fast.

In the present embodiment, each group is composed of four processors as compared with two processors in the sixth embodiment.

Eighth Embodiment

An eighth embodiment of the present invention will be described below with reference to FIG. 16. FIG. 16 shows a control truth value table for a power control section according to the eighth embodiment of the present invention.

In the first to the seventh embodiments, a method has been described that allows the allowable power to be controlled to half of the maximum power consumption.

In actual busy conditions, a single processor uses power that is, in many cases, equal to approximately half of the maximum power consumption on the average. A single processor frequently uses power that exceeds half of the maximum power consumption on a cycle basis. A plurality of processors in use can show performance decrement, even on the average, due to a factor related to power consumption.

In addition, constraint conditions for maximum power consumption is on a step-by-step basis if ready-made power supplies and packages are used. Therefore, there is an advantage that one-class-up products need not be used. For this reason, these power supplies and packages have sufficient capacity in normal use. If, nevertheless, the capacity of these power supplies and packages is not sufficient in a very rare case, the present invention helps to reduce semiconductor chip manufacturing costs and semiconductor chip weights if the present invention assure that such a very rare case is controlled.

In the present embodiment, the allowable power for every two processors is, in the configuration shown in the first embodiment, equal to ⅞ of the total sum of the maximum power consumptions for every two processors. The expected power consumption for each processor is available in eight levels: 1 to 18.

The total sum of the maximum power consumptions for every two processors is 16 while the allowable power for every two processor is 14. Each processor can keep operating without entering a deadlock state until the processor uses power that is equal to ⅞ of the maximum power consumption, that is, up to 7.

To avoid a deadlock state, each processor can secure a preferential right to use a power that is equal to a power consumption of up to 7 and operate. If the expected power consumption is 6 or less, one processor can maintain the allowable power even if the other processor uses power that is equal to a maximum power consumption of up to 8. If, therefore, the expected power consumption is 6 or less, a change is so made as to assert the signal PLOWL. Even if, in addition, one processor cannot issue an instruction, the other processor can operate using a power that is equal to a maximum power consumption of 8. However, there is a high probability that the expected power consumption will be 6 or less. One processor is designed not to use those instruction issue control signals that take some to produce.

Instruction issue control truth values for the power control section PML are as tabulated in FIG. 16. Two types 1 and 2 are available depending on input signal values and type 3, a complementary space (otherwise) for these types, is available.

In type 1, the expected-power consumption for one processor is 7 or less as shown under PCNTL and one processor issues a post instruction irrespective of PLOWR, the state signal for the other processor.

In type 2, the expected power consumption for one processor is 8 as shown under PCNTL. However, the power decoding section of the other processor has already asserted the signal PLOWR and the expected power consumption is 6 or less. The total sum of the expected power consumptions does not exceed the allowable power and one processor issues a subsequent instruction.

Although type 3 has a complementary space for the above two types, the above two types together show all cases where an instruction can be issued. Type 3 therefore corresponds to all cases where no instructions can be issued. Eventually, not eight levels but three levels, 6 or less, 7, and 8 are enough for expected power consumption.

Thus, setting the allowable power to a larger value allows power consumption to be efficiently and easily controlled to a level equal to or less than allowable power without using the instruction issue control signal for the other processor, signals that take some time to produce and convey.

Other Embodiments

Power consumption depends on not only the type of an instruction to be executed, but also memory capacity, memory mapped module type and the like, such as in cache. In addition, allowable power varies with system LSIs and system mounting system LSIs. If the same core is counted on different systems, power control in response to such a change allows power control with a higher level of accuracy.

Further, power consumption also varies with data to be processed. For example, power changes greatly between where mainly data having a small bit width is handled for controlling purposes and where data having the largest bit width is handled in multi-media systems, even if the same instruction is executed. Core design does not involve finalizing even what type of data will be process. Finer power control will be possible if adjustment of power control is performed depending on how users use processor cores.

In this way, it is effective to incorporate a mechanism as allows the adjustment of power control when designing or using a system. In the power decoding section PDEC, the adjustment of power control will be realized if variable conditions are used for encoding PCNTL, a signal showing eight levels of expected power consumption, and for asserting PLOWL, a signal showing a low power consumption state.

FIG. 17 shows a conversion table for expected power consumption and power control signal.

Type 1 corresponds to allowable power control in the first embodiment. Type 3 corresponds to allowable power control in the eighth embodiment.

Type 2 corresponds to allowable power control that is approximately intermediate between type 1 and type 3. The conversion table may be mounted in a register or a conversion table for use with types stored in a register may be fixedly mounted in hardware. For the former method, a new conversion table can be mounted after manufacture. However, the latter method uses less hardware and facilitates providing faster processors.

In addition, such a conversion rule and conversion table may be designed to be software-settable.

Furthermore, the embodiments described above use fixed values for allowable power for a plurality of processors. The allowable power for one module may be different from the allowable power for another module in a semiconductor chip. A different number of groups of processors each notifying one another of extra power can be mounted on different chips.

As described above in each embodiment, in a semiconductor device having a plurality of modules, according to the present invention, power control is performed based on distributed management. In the relationship between each module and other modules, a calculation is made of an optimal power amount that each module can consume and the allowable power for the entire chip can also be controlled.

The present invention relates to an integrated circuit having changing power consumption depending on the operational state thereof and particularly to a CMOS circuit and allows the management of the maximum power consumption and power distribution for the circuit.

With the expansion of cellular equipment markets including cellular phones, there is an growing importance of semiconductor chips that are operable at a low power. An ability to manage the maximum power consumption and power distribution can provide various benefits such as reduction in size and costs for power supply systems, reduction in LSI package costs, reduction in size and costs for heat dissipation systems, and ease of power supply design.

Reference numerals and symbols are to be described below. Processor on the left(R not L for the processor on the right)
CPUL: Processor
EDECL: Expanded decoding section
DECL: Instruction decoding section
PDECL: Power decoding section
PML: Power control section
EXEL0: Instruction execution section for preceding instruction
EXEL1: Instruction execution section for subsequent instruction
IFL: Instruction Fetch
OPL: Instruction code
PCNTL: Expected power consumption
PLOWL: Signal showing an expected power consumption of 1
GOL0: Signal showing that a preceding instruction determined by a factor other than power can be issued
GOL1: Signal showing that a subsequent instruction determined by a factor other than power can be issued
CNTL: Control signal
PGOL1: Signal showing that a subsequent instruction can be issued when power is taken into account
GOL: Signal showing that an instruction determined by a factor other than power can be issued
PST: Signal showing the power consumption during the preceding cycle
PTKNL: Signal showing a preferential cycle Processor in the middle (z not y for processor on the right; x not y for processor on the left)
CPUy: Processor
EDECy: Expanded decoding section
DECy: Instruction decoding section
PDECy: Power decoding section
PMy: Power control section
EXEy0: Instruction execution section for preceding instruction
EXEy1: Instruction execution section for subsequent instruction
IFy: Instruction Fetch
OPy: Instruction code
PCNTy: Expected power consumption
PLOWyL: Signal showing an expected power consumption of 3 or less
PLOWyR: Signal showing an expected power consumption of 2 or less
GOy0: Signal showing that a preceding instruction determined by a factor other than power can be issued
GOy1: Signal showing that a subsequent instruction determined by a factor other than power can be issued
CNTy: Control signal
PGOy1: Signal showing that a subsequent instruction can be issued when power is taken into account Processor in element ty (ty is replaced with ij by each array element)
CPUty: Processor
EDECty: Expanded decoding section
DECty: Instruction decoding section
PDECty: Power decoding section
PMty: Power control section
EXEty0: Instruction execution section for preceding instruction
EXEty1: Instruction execution section for subsequent instruction
IFty: Instruction Fetch
OPty: Instruction code
PCNTty: Expected power consumption
PLtyL: Signal showing an expected power consumption of 3 or less
PLtyR: Signal showing an expected power consumption of 2 or less PLtyU: Signal showing an expected power consumption of 1 or less
PLtyD: Signal showing an expected power consumption of 0
CNTty: Control signal
PGOty1: Signal showing that a subsequent instruction can be issued when power is taken into account

What is claimed is:

1. A data processing device comprising:
   a first module for processing data; and
   a second module for processing data;
   wherein the first module comprises a first power decoding section and a first instruction fetch section,
   a predetermined allowable power consumption value is given for each of said first and second modules,
   wherein the first power decoding section receives an instruction code from the first instruction fetch section, determines expected power consumption based on instruction type and instruction issue of the instruction code, and notifies said second module of a difference between said predetermined allowable power consumption value and said expected power consumption,
   wherein when said second module is not notified of said extra power by said first module, said second module uses said predetermined allowable power consumption value as consumable power to perform data processing,
   wherein when said second module is notified of said extra power by said first module, said second module uses the sum of said predetermined power consumption value and said extra power notified as consumable power to perform data processing, and
   wherein when said second module is not notified of said extra power by said first module and said second module requires said extra power to execute said instruction code, said second module delays execution of said instruction code.

2. The data processing device according to claim 1 wherein said extra power is notified to said second module based on expected power consumption before power is consumed.

3. The data processing device according to claim 1,
   wherein said first module notifies said extra power to a plurality of said second modules; and
   wherein said second module uses the sum of said predetermined power consumption value and extra powers notified by a plurality of said first modules to perform data processing as consumable power.

4. The data processing device according to claim 1 wherein a predetermined power consumption value changes, which is given for each of said first and second modules.

5. The data processing device according to claim 4 wherein the total sum of predetermined power consumption values does not change, which are given for said first and second modules.

6. A semiconductor device comprising:
   a first processor; and
   a second processor
   wherein the first processor comprises a first power decoding section and a first instruction fetch section,
   a predetermined allowable power consumption value for executing an instruction is given for said first and second processors;
   wherein the first power decoding section receives an instruction code from the first instruction fetch section, determines expected power consumption based on instruction type and instruction issue of the instruction code, and notifies said second processor of a difference between said predetermined allowable power consumption value and said expected power consumption,
   wherein when said second processor is not notified of said extra power by said first processor, said second module uses said predetermined allowable power consumption value as consumable power to perform instruction execution,
   wherein when said second processor is notified of said extra power by said first processor, said second processor uses the sum of said predetermined power consumption value and said extra power notified to perform instruction execution as consumable power, and
   wherein when said second module is not notified of said extra power by said first module and said second module requires said extra power to execute said instruction code, said second module delays execution of said instruction code.

7. The semiconductor device according to claim 6 wherein said second processor is notified of extra power when decoding or issuing an instruction.

8. The semiconductor device according to claim 6 wherein when notified of the extra power by said first processor, said second processor performs instruction issuance control taking into account the extra power notified thereto when decoding or issuing the instruction.

9. The semiconductor device according to claim 6 wherein said predetermined power consumption value given for each of said first and second processors is given as a value for power consumed on each cycle.

10. The semiconductor device according to claim 6 wherein said predetermined power consumption value given for each of said first and second processors is given as a value of power consumed during a predetermined number of cycles.

11. The semiconductor device according to claim 6 wherein said predetermined power consumption value given for each of said first and second processors can be changed by means of a program.

12. The semiconductor device according to claim 6,
    wherein said first and second processors are defined as one group of processors that notify each other of the extra power; and
    wherein a plurality of said groups are configured in said semiconductor device.

13. The semiconductor device according to claim 12,
    wherein said first processor comprises an extra power notification section for notifying the extra power;
    wherein said second processor comprises a power control section for being notified of the extra power by said extra power notification section; and
    wherein said first and second processors in said group are arranged such that said extra power notification section and said power control section are disposed close to each other.

* * * * *